United States Patent
Dela Rosa et al.

(10) Patent No.: US 12,530,852 B2
(45) Date of Patent: Jan. 20, 2026

(54) OPTICAL CHARACTER RECOGNITION FOR AUGMENTED IMAGES

(71) Applicant: Snap Inc., Santa Monica, CA (US)

(72) Inventors: Kevin Sarabia Dela Rosa, Seattle, WA (US); Byung Eun Jeon, Seattle, WA (US); Zelun Wang, Malden, WA (US)

(73) Assignee: Snap Inc., Santa Monica, CA (US)

( * ) Notice: Subject to any disclaimer, the term of this patent is extended or adjusted under 35 U.S.C. 154(b) by 335 days.

(21) Appl. No.: 18/131,413

(22) Filed: Apr. 6, 2023

(65) Prior Publication Data

US 2024/0338900 A1 Oct. 10, 2024

(51) Int. Cl.
*G06T 19/00* (2011.01)
*G06F 40/109* (2020.01)
*G06F 40/56* (2020.01)
*G06T 5/50* (2006.01)
*G06V 10/25* (2022.01)
*G06V 10/774* (2022.01)

(52) U.S. Cl.
CPC .......... *G06T 19/006* (2013.01); *G06F 40/109* (2020.01); *G06F 40/56* (2020.01); *G06T 5/50* (2013.01); *G06V 10/25* (2022.01); *G06V 10/774* (2022.01); *G06T 2207/20132* (2013.01); *G06T 2207/20221* (2013.01)

(58) Field of Classification Search
CPC ..... G06T 19/006; G06F 40/109; G06F 40/56; G06V 10/25; G06V 10/774
USPC ........................................................ 345/633
See application file for complete search history.

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |
| 5,880,731 | A | 3/1999 | Liles et al. |
| 6,023,270 | A | 2/2000 | Brush et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

(Continued)

*Primary Examiner* — Thomas J Lett
(74) *Attorney, Agent, or Firm* — Schwegman Lundberg & Woessner, P.A.

(57) ABSTRACT

Methods and systems are disclosed for performing optical character recognition on augmented images. The system accesses an image depicting a real-world environment augmented with a graphical element. The system recognizes the graphical element in the image by applying a machine learning (ML) model to the image. The system stores a standard code representing the graphical element that has been recognized in association with the image.

20 Claims, 12 Drawing Sheets

(56) References Cited

U.S. PATENT DOCUMENTS

| | | |
|---|---|---|
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,010,284 B1 * | 5/2021 | Santiago ............... G06N 20/00 |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |

(56) References Cited

U.S. PATENT DOCUMENTS

| | | |
|---|---|---|
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0118239 A1* | 5/2014 | Phillips .................. G06F 3/1454 345/156 |
| 2014/0125678 A1 | 5/2014 | Wang et al. |
| 2014/0129343 A1 | 5/2014 | Finster et al. |
| 2015/0206033 A1* | 7/2015 | Krivosheev ......... G06F 18/2178 382/161 |
| 2015/0206349 A1 | 7/2015 | Rosenthal et al. |
| 2016/0026253 A1* | 1/2016 | Bradski ................ H04N 13/128 345/8 |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0150245 A1* | 5/2021 | Liu ......................... G06F 18/22 |
| 2021/0157475 A1* | 5/2021 | Hansbrough ......... G06F 40/177 |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0350122 A1* | 11/2021 | Dixon .................... G06V 30/36 |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from

(56) References Cited

OTHER PUBLICATIONS the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

"Ankush-me / SynthText", [Online]. Retrieved from the Internet: <URL: https://web.archive.org/web/20221021221144/https://github.com/ankush-me/SynthText>, (archived Oct. 21, 2022), 5 pgs.

"Belval / TextRecognitionDataGenerator", [Online]. Retrieved from the Internet: <URL: https://web.archive.org/web/20221117150020/https://github.com/Belval/TextRecognitionDataGenerator>, (archived on Nov. 17, 2022), 7 pgs.

"Clovaai / CRAFT-pytorch", [Online]. Retrieved from the Internet: <URL: https://web.archive.org/web/20221221172712/https://github.com/clovaai/CRAFT-pytorch>, (archived Dec. 21, 2022), 5 pgs.

"Detect text in images", Cloud Vision API, [Online]. Retrieved from the Internet: <URL: https://web.archive.org/web/20221223094355/https://cloud.google.com/vision/docs/ocr>, (archived Dec. 23, 2022), 5 pgs.

"JaidedAI / EasyOCR", [Online]. Retrieved from the Internet: <URL: https://web.archive.org/web/20221229010450/https://github.com/JaidedAI/EasyOCR>, (archived Dec. 29, 2022), 8 pgs.

"Minimaxir / imgmaker", [Online]. Retrieved from the Internet: <URL: https://web.archive.org/web/20221226042621/https://github.com/minimaxir/imgmaker>, (archived Dec. 26, 2022), 6 pgs.

"wkentaro / labelme", [Online]. Retrieved from the Internet: <URL: https://web.archive.org/web/20230316025227/https://github.com/wkentaro/labelme>, (archived on Mar. 16, 2023), 7 pgs.

Long, Shangbang, et al., "TextSnake: A Flexible Representation for Detecting Text of Arbitrary Shapes", arXiv:1807.01544v2 [cs.CV], (Aug. 18, 2020), 17 pgs.

Sheng, Fenfen, et al., "NRTR: A No-Recurrence Sequence-to-Sequence Model for Scene Text Recognition", arXiv:1806.00926v2 [cs.CV], (Oct. 10, 2019), 6 pgs.

Shi, Baoguang, et al., "An End-to-End Trainable Neural Network for Image-based Sequence Recognition and Its Application to Scene Text Recognition", arXiv:1507.05717v1 [cs.CV], (Jul. 21, 2015), 9 pgs.

\* cited by examiner

OPTICAL CHARACTER RECOGNITION FOR AUGMENTED IMAGES

TECHNICAL FIELD

The present disclosure relates to text and object recognition techniques.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like. Sometimes images include AR modifications and such images are posted to an online network and/or shared with other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
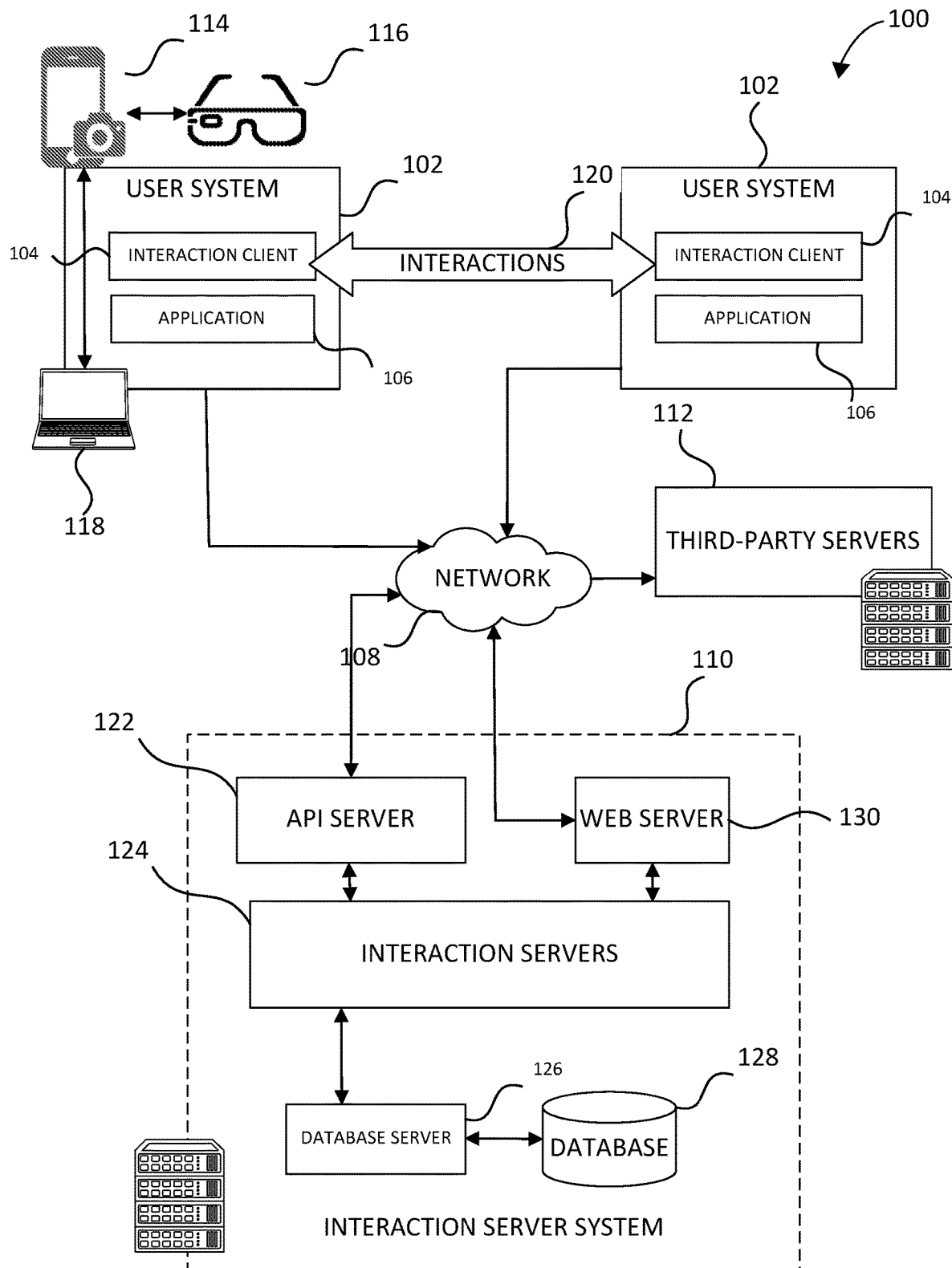
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typical systems allow users to exchange messages that include images and/or videos. Such images and video can be overlaid with or can be augmented with text and/or graphical elements, such as emojis. Certain systems may need to perform operations on these images based on the augmented content of the images, such as to categorize the images. In order to do so, these systems need to apply optical character recognition (OCR) techniques to the images to recognize the augmented content. However, conventional OCR techniques are usually very limited in their capabilities. The inputs to these OCR techniques need to be clear images with text aligned in a particular direction. Also, typical OCR techniques may be capable of detecting text but are unable to identify and recognize graphical elements that may be depicted in the images. As such, these typical systems fail to properly categorize and detect augmentations in the images, which results in moderators having to manually review and categorize the images. This introduces inefficiencies and manual errors resulting from human review, and as the amount of content that is exchanged increases, the ability for humans to review all the content becomes impracticable.

The disclosed techniques seek to improve the way in which images are categorized and processed to recognize text and/or graphical elements in the images. Particularly, the disclosed techniques provide a first machine learning (ML) model that detects text and/or graphical elements (e.g., emojis) in an individual image. The detection results in a bounding box that identifies the specific location and orientation of the text and/or graphical elements. Using these detection results, a portion of the image that includes the text and/or graphical elements is cropped and applied to a second ML model. The second ML model recognizes the text and/or graphical elements in the cropped portion of the image and outputs a sentence or multiple sentences that include the text and/or graphical elements. The graphical elements can be output in a standard code, such as Unicode, to enable further processing based on the standard code representation of the graphical elements. In this way, images can be processed very quickly and efficiently to recognize text and/or graphical elements overlaid or augmented on such images to enable further operations, such as ranking of content, categorization of the images, and/or content moderation of content based on the recognized text and/or graphical elements.

In some examples, the disclosed techniques generate a collection of training images to train the first and/or second ML models. The training images can be generated based on publicly available content including previously posted images and/or text and/or graphical elements. Particularly, the training images can be generated by accessing messages posted on a public network by a first set of users and extracting text from the messages. An individual graphical element can be selected from a set of graphical elements and combined with the extracted text. In some cases, attributes (e.g., a font style, color, size, and/or orientation) of the text can be modified prior to being combined with the individual graphical element. A screenshot is generated that includes the combined extracted text with the individual graphical element on a transparent background. A background image can be from a set of background images posted to the public network and can be augmented with the screenshot of the combined extracted text with the individual graphical element. The augmented background image can then be used as one of the training images for training the first and/or second ML models.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110, and third-party servers 112. An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
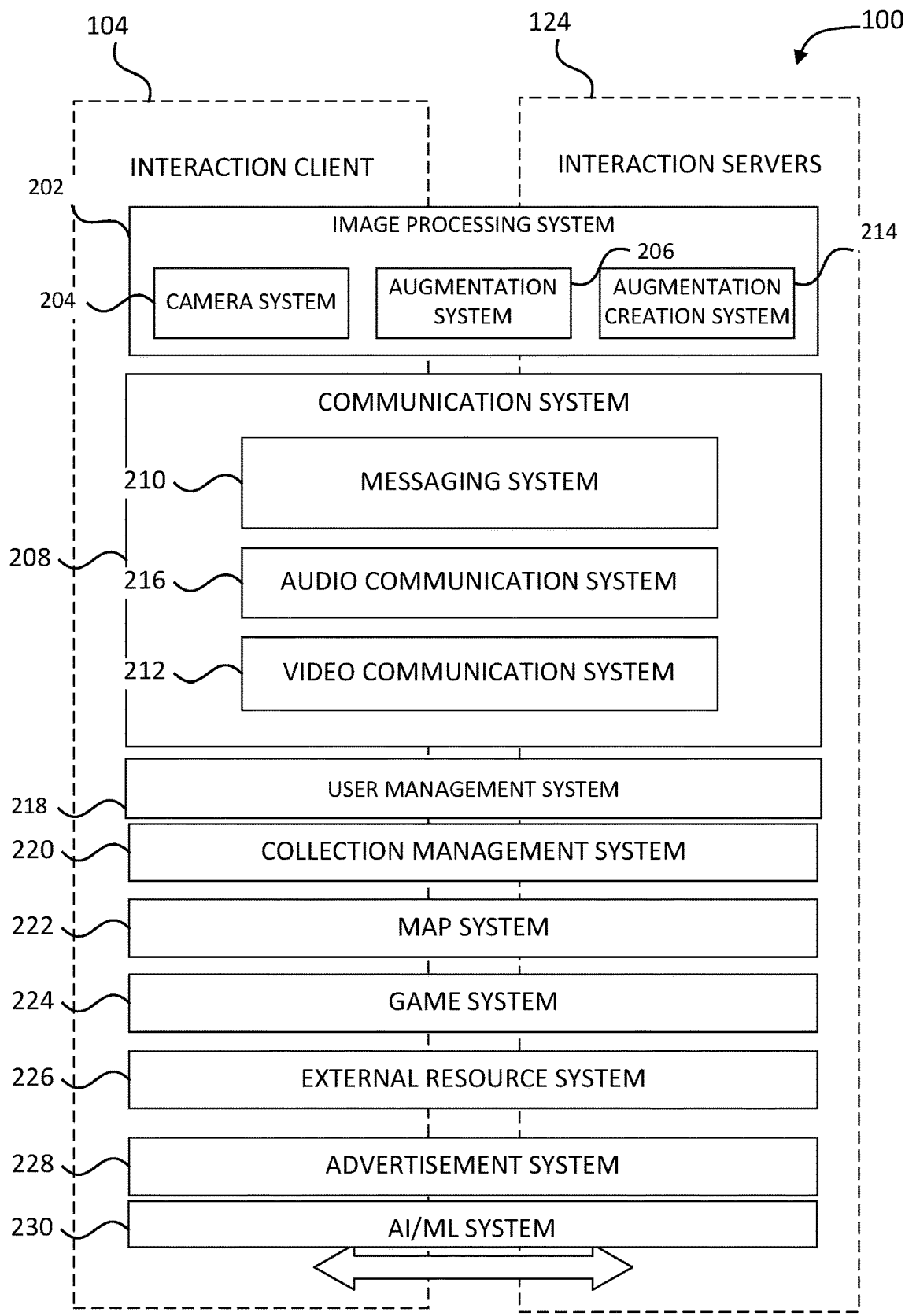
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include an optical character recognition system 500 that generates a mesh of an object depicted in a two-dimensional (2D) image, such as a user, to enable a user to control an interaction client/application/(extended reality (XR) experience. An illustrative implementation of the optical character recognition system 500 is shown and described in connection with FIG. 5 below.

In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 (shown in FIG. 12) of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as messaging system 210 and video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within a user management system 218) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310, and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., 2D avatars of users with or without different avatar characteristics). As another example, external resources that include small-scale versions of applications (e.g., web-based versions of applications) are provided with access to a second type of user data (e.g., payment information, 2D of users, three-dimensional (3D) avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content, XR experiences, and AR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands. In some cases, the artificial intelligence and machine learning system 230 can implement one or more machine learning models that detect text and/or graphical elements overlaid on an image depicting a real-world environment and recognize such detected text and/or graphical elements. The output of the machine learning models can be used to form or generate sentences including the text and/or graphical elements to categorize, moderate, search, and/or rank content associated with the image.

Data Architecture

Figure 3:
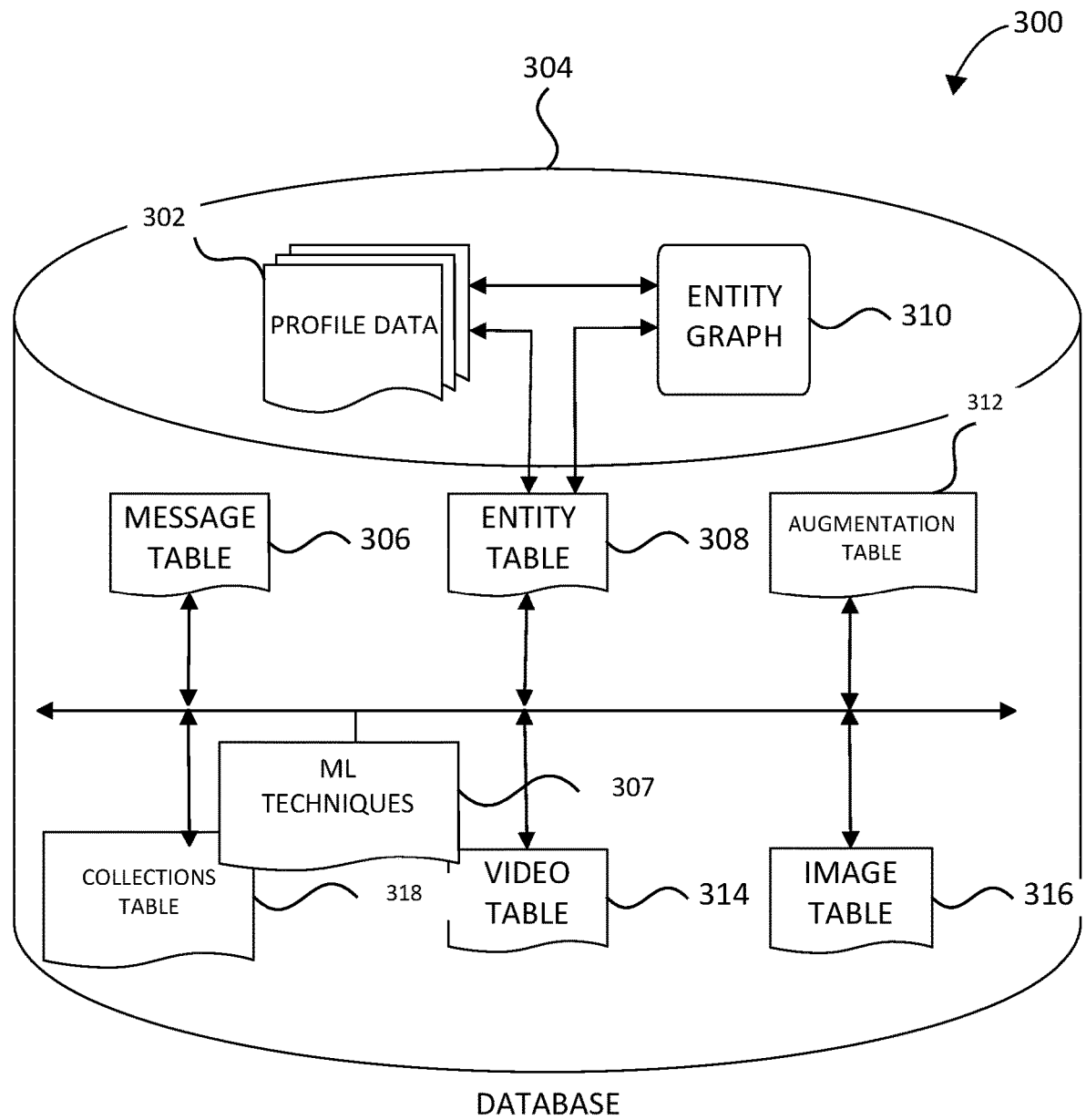
FIG. 3 is a diagrammatic representation of a data structure as maintained in a database, according to some examples.

FIG. 3 is a schematic diagram illustrating data structures 300, which may be stored in a database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100 and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying "lenses" or AR experiences). An AR content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user.

To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained ML techniques 307 that store parameters of one or more ML models that have been trained during training of the optical character recognition system 500. For example, trained ML techniques 307 store the trained parameters of one or more artificial neural network machine learning models or techniques.

Data Communications Architecture

Figure 4:
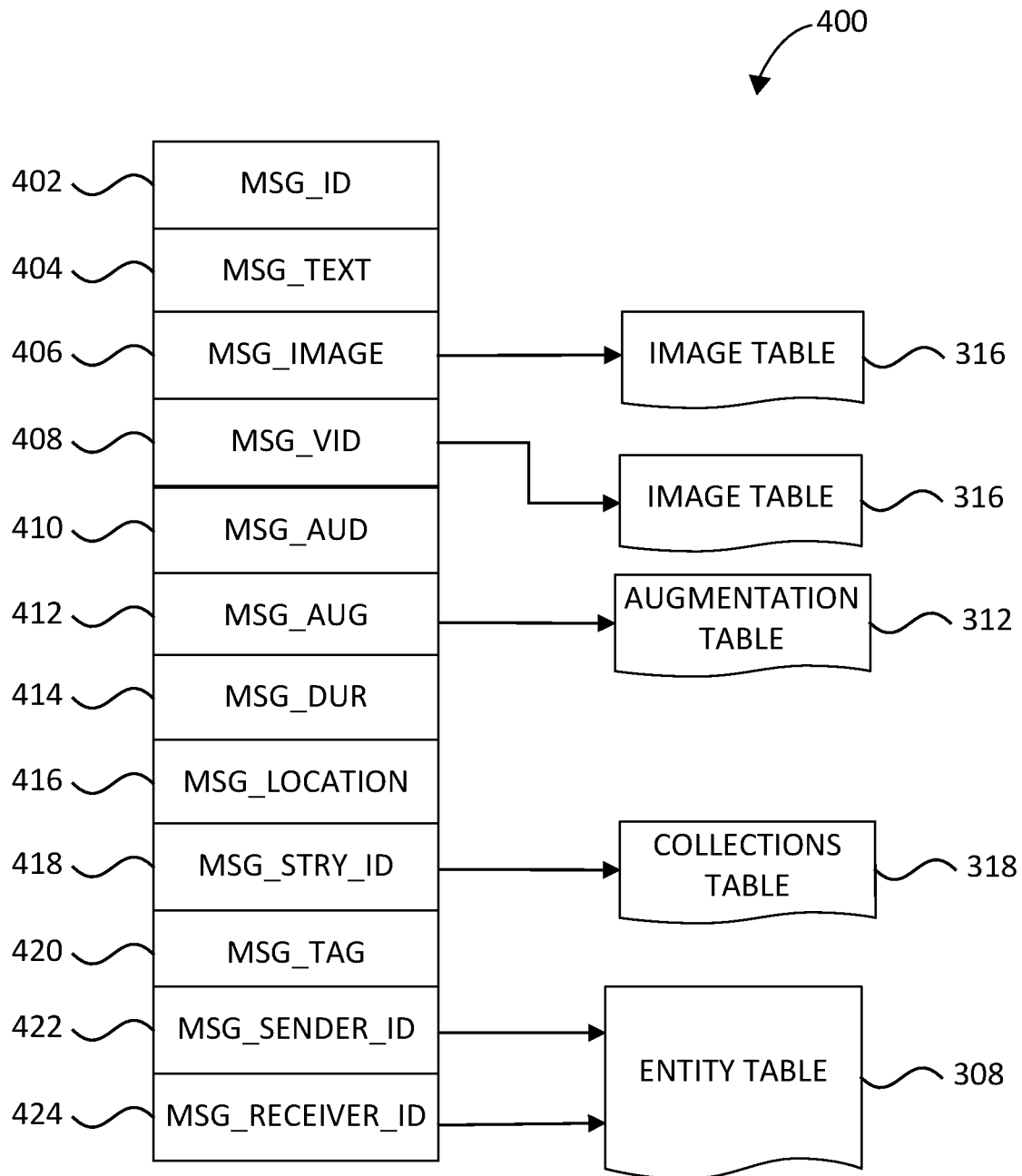
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Optical Character Recognition System

Figure 5:
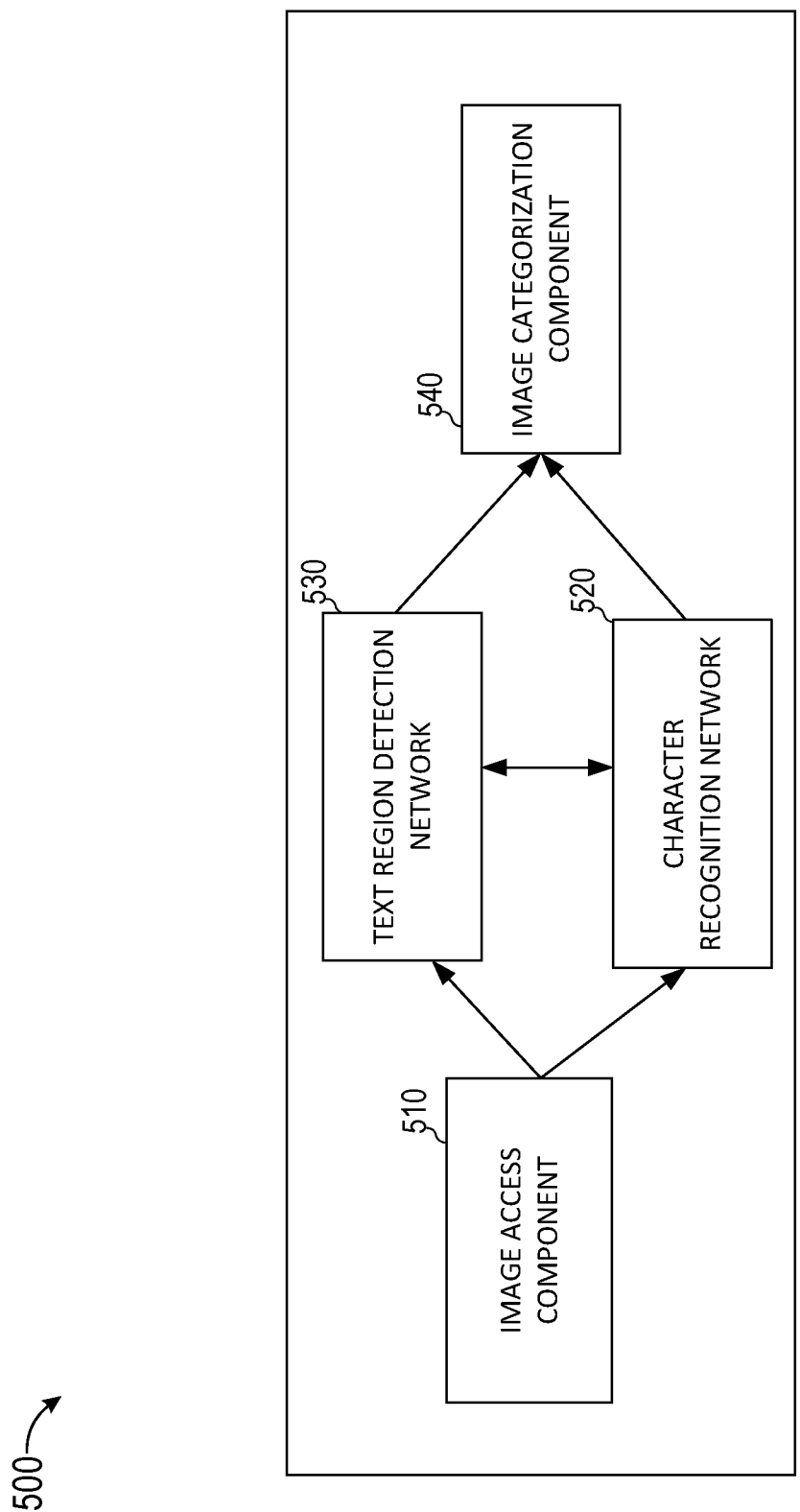
FIG. 5 is a diagrammatic representation of an optical character recognition system, in accordance with some examples.

FIG. 5 is a block diagram showing an example optical character recognition system 500, according to some examples. The optical character recognition system 500 applies a first ML model to detect text and/or graphical elements (e.g., emojis) in an individual image. The detection results in a bounding box that identifies the specific location and orientation of the text and/or graphical elements. Using these detection results, the optical character recognition system 500 crops a portion of the image that includes the text and/or graphical elements and applies a second ML model to the cropped portion. The second ML model recognizes the text and/or graphical elements in the cropped portion of the image and outputs a sentence or multiple sentences that include the text and/or graphical elements. The graphical elements can be output in a standard code, such as Unicode, to enable further processing based on the standard code representation of the graphical elements. In this way, images can be processed very quickly and efficiently to recognize text and/or graphical elements overlaid or augmented on such images to enable further operations, such as ranking of content, categorization of the images, and/or content moderation of content based on the recognized text and/or graphical elements. The optical character recognition system 500 can include an image access component 510, a text region detection network 530, an optical character network 520, and/or an image categorization component 540.

In some examples, the optical character recognition system 500 accesses an image depicting a real-world environment augmented with a graphical element. The optical character recognition system 500 recognizes the graphical element in the image by applying an ML model (e.g., the first and/or second ML models) to the image. The optical character recognition system 500 stores a standard code representing the graphical element that has been recognized in association with the image. In some examples, the graphical element includes an emoji and the standard code includes Unicode of the graphical element.

In some examples, the optical character recognition system 500 generates a bounding box around a portion of the image that has been augmented with the graphical element by applying a text detection model (e.g., the first ML model) to the image. The optical character recognition system 500 crops the portion of the image and applies the ML model (e.g., the second ML model) to the cropped portion of the image. In some examples, the image is further augmented with text. In such cases, the optical character recognition system 500 recognizes the text in the image by applying the ML model to the image and storing the recognized text and the standard code representing the graphical element in association with the image.

In some examples, the optical character recognition system 500 determines an orientation and position of the text and the graphical element by applying the text detection model to the image. In response to determining the orientation and position of the text and the graphical element, the optical character recognition system 500 determines that the text and the graphical element are on a same line and/or along a same direction. In response to determining that the text and the graphical element are on the same line and along the same direction, the optical character recognition system 500 generates a first sentence that includes the text and the standard code. In some cases, the optical character recognition system 500 detects additional text in the image by applying the ML model to the image and determining that the additional text is on a different line than the text and the graphical element that are on the same line. In response to determining that the additional text is on a different line than the text and the graphical element that are on the same line, the optical character recognition system 500 generates a second sentence that includes the additional text.

In some examples, the optical character recognition system 500 generates training data for training the ML model. The training data includes a collection of training images that depict real-world environments augmented with text and graphical elements, with each of the training images in the collection of training images being associated with respective ground truth text and standard code representations of the graphical elements and respective ground truth location information of the text and graphical elements. In some examples, the text and graphical elements in the training images have different font styles, font sizes, font orientation, and font colors.

In some examples, the optical character recognition system 500 accesses messages posted on a public network by a first set of users, extracts text from the messages, and modifies one or more attributes of the extracted text. The optical character recognition system 500 selects an individual graphical element from a set of graphical elements and combines the extracted text having the modified one or more attributes with the individual graphical element. In some examples, the optical character recognition system 500 accesses messages in which text and graphical elements are already present. Namely, the optical character recognition system 500 can search for messages that include both text and graphical elements. The optical character recognition system 500 generates a screenshot that includes the combined extracted text with the individual graphical element on a transparent background. The optical character recognition system 500 selects a background image from a set of background images posted to the public network by a second set of users (that can be the same as or different at least in part from the first set of users). The optical character recognition system 500 selects a random size and orientation as a bounding box for the screenshot that includes the combined extracted text with the individual graphical element. The optical character recognition system 500 augments the selected background image with the screenshot in the random size and orientation to generate an individual training image in the collection of training images. This process is repeated until the collection of training images includes a threshold minimum quantity of training images.

In some examples, the optical character recognition system 500 trims redundant margins around the combined extracted text with the individual graphical element in the screenshot. In some examples, the one or more attributes include at least one of a font style, a font size, a font orientation, and a font color. In some examples, the optical character recognition system 500 associates the individual training image with ground truth information including the extracted text, the individual graphical element, and the selected random size and orientation. In some examples, the optical character recognition system 500 prevents the bounding box for the screenshot from overlapping a different bounding box for another augmented element or real-world text in the individual training image. In some examples, the optical character recognition system 500 processes the set of background images to remove any background image from the set of background images that includes real-world or overlaid text using a text detection model.

In some examples, optical character recognition system 500 trains the ML model by performing training operations. These operations include selecting a first training image from the collection of training images depicting a first real-world environment augmented with a combination of text and one or more graphical elements and predicting a bounding box representing location information for the combination of text and the one or more graphical elements by applying a text detection model to the first training image. The operations include obtaining the ground truth location information for the combination of text and one or more graphical elements associated with the first training image and computing a deviation between the ground truth location information and the predicted bounding box. The optical character recognition system 500 updates one or more parameters of the text detection model based on the computed deviation between the ground truth location information and the predicted bounding box.

In some examples, the training operations include cropping a portion of the first training image using the predicted bounding box and recognizing the text and the one or more graphical elements in the first training image by applying the ML model to the first training image. The optical character recognition system 500 obtains the ground truth text and one or more standard code representations of the one or more graphical elements and computes an additional deviation between the ground truth text and the one or more standard code representations and the recognized the text and the one or more graphical elements. The optical character recognition system 500 updates one or more parameters of the ML model based on the additional computed deviation.

In some examples, the optical character recognition system 500 categorizes or ranks the image based on the standard code representing the graphical element that has been recognized in association with the image. In some cases, the optical character recognition system 500 searches a database of images to find one or more images that are related to the accessed image using the standard code representing the graphical element that has been recognized in association with the image.

For example, the optical character recognition system 500 includes an image access component 510. The image access component 510 can access a real-time or previously stored image or video from the user system 102. The image access component 510 can select a frame or collection of frames from the accessed image or video for use in recognizing text and/or graphical elements that have been overlaid onto a real-world environment depicted in the image. During training of the optical character recognition system 500 (e.g., during training of the text region detection network 530 and/or the optical character network 520), the image access component 510 accesses a database of training images to retrieve images that depict real-world environments augmented with text and/or graphical elements, with each of the training images in the collection of training images being associated with respective ground truth text and standard code representations of the graphical elements and respective ground truth location information of the text and graphical elements.

Figure 6:
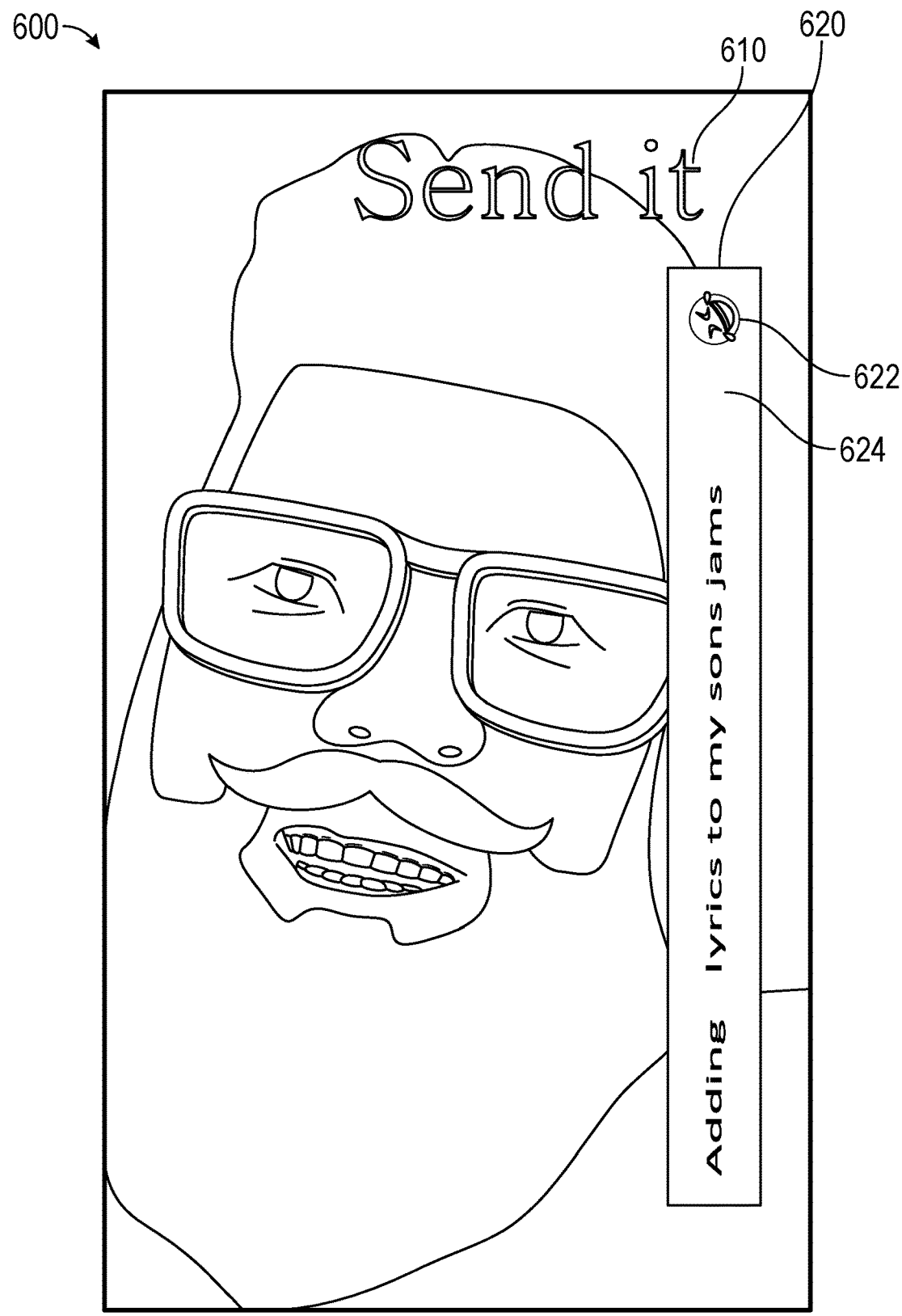
FIGS. 6 and 7 are example images in which objects have been recognized by the optical character recognition system, in accordance with some examples.

During operation (e.g., after being trained), the image access component 510 provides the image depicting the real-world environment augmented with the text and/or graphical objects to the text region detection network 530 and/or the optical character network 520. The text region detection network 530 processes the image to detect text and/or graphical elements that were used to augment the image. In some cases, the text region detection network 530 generates a bounding box that indicates coordinates for each region that includes text and/or graphical elements. The text region detection network 530 provides as an output an orientation for the text and/or graphical elements in each region. For example, as shown in FIG. 6, an image 600 can be accessed by the image access component 510. The text region detection network 530 can process the image 600 to detect a first region 610 that includes only text. The text region detection network 530 can detect a second region 620 that includes both text 624 and one or more graphical elements 622. The text region detection network 530 indicates that the text in the first region 610 is oriented in a horizontal direction on a first line. The text region detection network 530 indicates that the text 624 and one or more graphical elements 622 in the second region 620 are oriented in a vertical direction on a second line.

Figure 7:
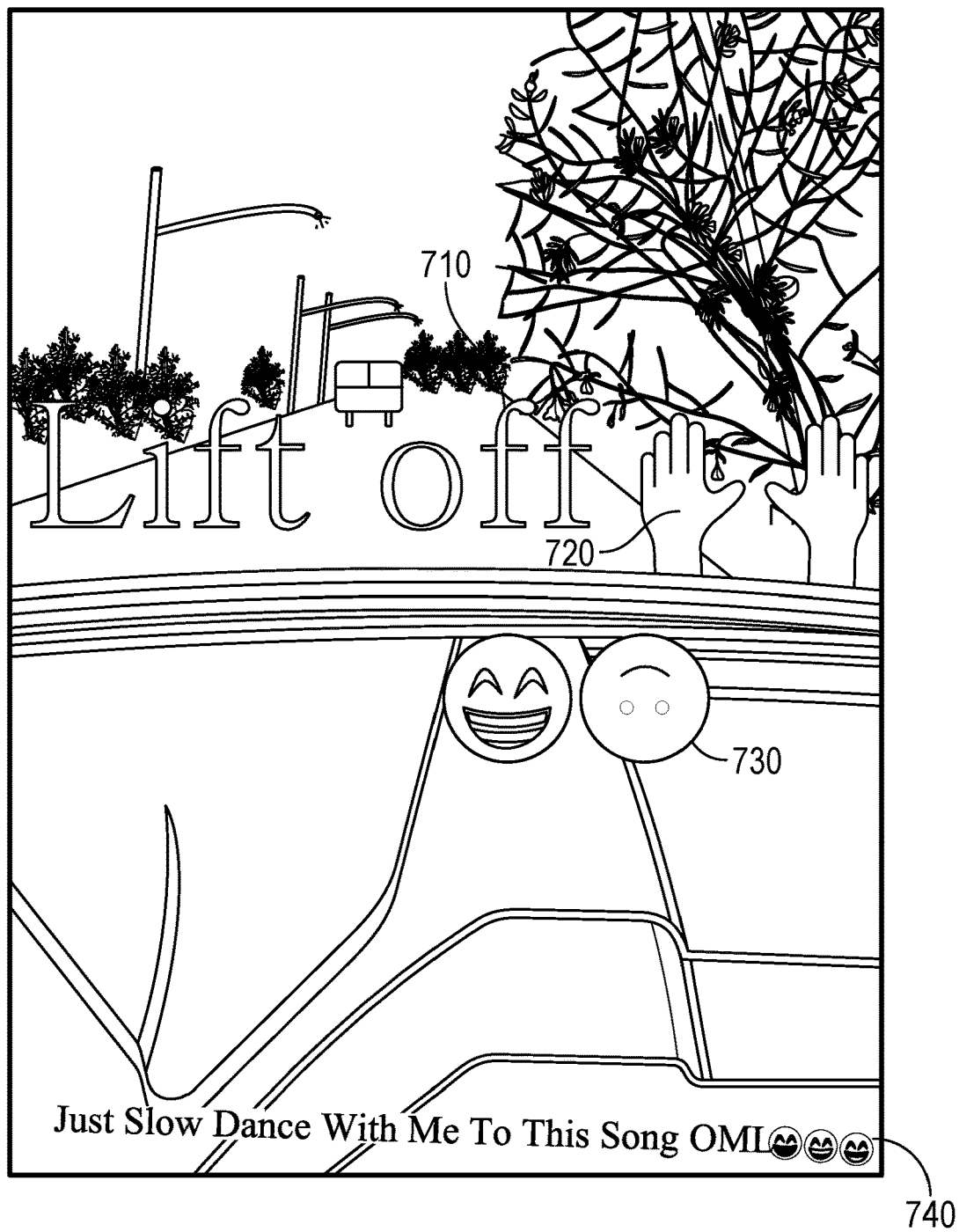

As another example, as shown in FIG. 7, an image 700 can be accessed by the image access component 510. The text region detection network 530 can process the image 700 to detect a first region that includes text 710 and one or more graphical elements 720. The text region detection network 530 can detect one or more graphical elements 730 in a second region of the image 700. The text region detection network 530 can detect text and one or more graphical elements in a third region 740 of the image 700. The text and/or graphical elements in each region can be used to form a respective sentence that includes the text and/or standard code representations of the graphical elements depicted in the respective regions.

In some cases, the text region detection network 530 crops each region of the image that includes the text and/or graphical elements. If multiple regions of text and graphical elements are detected, the text region detection network 530 generates multiple crops of the image, with each including the text and/or graphical elements of the specific region. The text region detection network 530 provides the cropped regions of the image to the optical character network 520. The optical character network 520 processes the cropped regions of the image to recognize text and/or graphical elements depicted in the region. In some cases, the optical character network 520 generates a first sentence with one or more words representing the text detected in the cropped region and Unicode characters representing the graphical elements detected in the cropped region. For example, the optical character network 520 can generate a first sentence with the words of the text detected in the first region 610 that has been cropped. The optical character network 520 can generate a second sentence with the words of the text 624 detected in the second region 620 that has been cropped combined with Unicode characters representing the one or more graphical elements 622 detected in the second region 620.

The optical character network 520 provides these sentences that are generated to the image categorization component 540. The image categorization component 540 identifies one or more keywords and/or contextual words associated with the Unicode characters for each sentence. The image categorization component 540 associates the keywords and/or the contextual words with the image, such as image 600. The image categorization component 540 can use the keywords and/or the contextual words of the image to perform additional operations, such as moderating content, ranking content, and/or searching for content. For example, if the image categorization component 540 determines that the keywords match a list of unallowed keywords, the image categorization component 540 can prevent posting the image that is associated with the keywords to an online public network and/or can remove the image from the online public network. In some cases, the image categorization component 540 can add the image associated with the keywords to a list of images that are associated with the same set of keywords. This enables a user to search for images or content based on keywords. For example, if a user inputs a search string, the image categorization component 540 can return images that are associated with keywords matching the search string where the keywords were generated based on text and/or graphical elements augmented or overlaid on the returned images. In some cases, the image categorization component 540 can rank a set of images based on the associated keywords.

To train the text region detection network 530 and/or the optical character network 520, the optical character recognition system 500 can generate a collection of training data that includes training images. Specifically, the optical character recognition system 500 can access a list of messages and/or comments posted by various users to one or more public networks. The optical character recognition system 500 can select an individual message from the list of messages to extract text from the individual message. The optical character recognition system 500 can then generate a new set of text strings by modifying various attributes of the text, such as modifying a font type, font color, font style, and/or font size of the text.

The optical character recognition system 500 can then search the one or more public networks to identify one or more graphical elements posted by various users to the public networks. Each graphical element can be associated with a corresponding Unicode character representation. The optical character recognition system 500 can select one or more of the graphical elements and can combine the selected one or more graphical elements with the text having the modified attributes. In some examples, the optical character recognition system 500 searches the one or more public networks to identify messages that include both text and graphical elements. In some cases, the optical character recognition system 500 can associate a first set of graphical elements with a first instance of the text having a first modified attribute and can associate a second set of graphical elements with a second instance of the text having a second modified attribute. The optical character recognition system 500 can then generate many screenshots that include various combinations of the text with modified attributes and different graphical elements. The optical character recognition system 500 can clean up each of the screenshots by trimming redundant margins around the combined extracted text with the graphical elements in the screenshots.

The optical character recognition system 500 can then access the online public network to find various background images posted by one or more users. The optical character recognition system 500 can process the background images, such as using the text region detection network 530, to determine whether text and/or graphical elements have previously been used to augment the background images. The optical character recognition system 500 removes from the background images any background image that includes text and/or graphical elements. The optical character recognition system 500 selects an individual background image (e.g., randomly) and augments the background image with one of the many screenshots of the text combined with the graphical elements.

The optical character recognition system 500 can select a size and orientation randomly from a set of different sizes and orientations for bounding boxes. The optical character recognition system 500 can verify that the selected size and orientation does not overlap another randomly selected size and orientation for the same background image. This prevents a first set of text and graphical elements that are added to the background image from overlapping a second set of text and graphical elements that are added to the same background image. The optical character recognition system 500 can augmented the background image with a given one of the screenshots according to the selected size and orientation. Namely, the optical character recognition system 500 places the screenshot in a particular size and in a particular orientation (e.g., diagonally, vertically, horizontally, and so forth) in the background image. This results in one training image that is stored in the collection of training images. This training image is associated with ground truth localization or location information that includes the randomly selected size and orientation. The training image also is associated with the ground truth recognition information including the extracted text and the Unicode character representation of the selected graphical elements. After many or a sufficient quantity of training images are generated in this manner, the optical character recognition system 500 starts training of the optical character network 520 and the text region detection network 530.

In some examples, the optical character recognition system 500 trains the text region detection network 530 by retrieving a first training image from the collection of training images. The text region detection network 530 predicts a bounding box representing location information for the combination of text and the one or more graphical elements by processing the first training image. The text region detection network 530 obtains the ground truth location information for the combination of text and one or more graphical elements associated with the first training image and computes a deviation between the ground truth location information and the predicted bounding box. The text region detection network 530 updates one or more parameters of the text region detection network 530 based on the computed deviation between the ground truth location information and the predicted bounding box. The text region detection network 530 then retrieves another training image and performs the same training operations until a stopping criterion is reached and/or until all of the training images in the collection have been processed.

The optical character recognition system 500 crops a portion of the first training image using the predicted bounding box. The optical character network 520 recognizes the text and the one or more graphical elements in the first training image by processing the cropped portion of the first training image. The optical character network 520 obtains the ground truth text and one or more standard code representations of the one or more graphical elements and computes an additional deviation between the ground truth text and the one or more standard code representations and the recognized the text and the one or more graphical elements. The optical character network 520 updates one or more parameters of the optical character network 520 based on the additional computed deviation. The optical character network 520 then retrieves another training image cropped portion and performs the same training operations until a stopping criterion is reached and/or until all of the training image cropped portions in the collection have been processed.

Once the optical character network 520 and the text region detection network 530 complete training, the parameters of the ML models implementing the optical character network 520 and the text region detection network 530 are stored. The optical character network 520 and the text region detection network 530 can then be used to process a newly received image that has been augmented with text and/or graphical elements to recognize the text and Unicode character representations of the graphical elements in the image.

Figure 8:
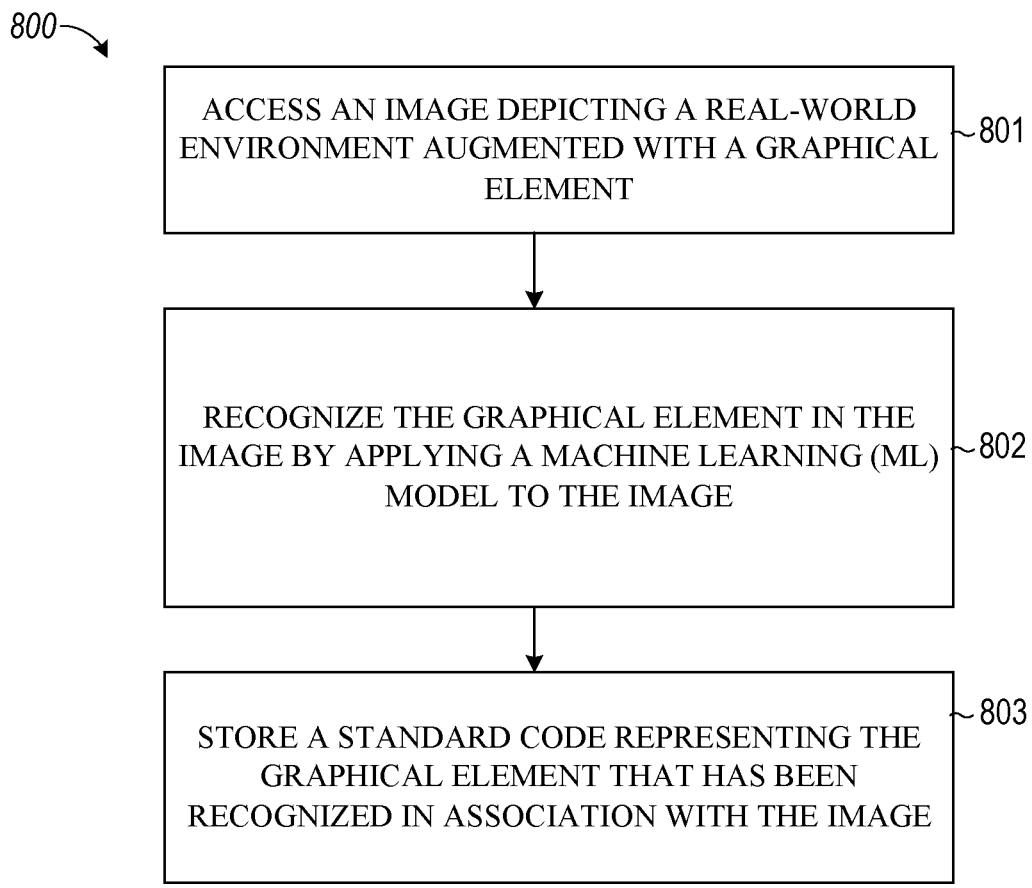
FIGS. 8 and 9 are flowcharts illustrating example operations of the optical character recognition system, in accordance with some examples.

FIG. 8 is a flowchart of a process 800 performed by the optical character recognition system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, the optical character recognition system 500 (e.g., a user system 102 or a server) accesses an image depicting a real-world environment augmented with a graphical element, as discussed above.

At operation 802, the optical character recognition system 500 recognizes the graphical element in the image by applying a ML model to the image, as discussed above.

At operation 803, the optical character recognition system 500 stores a standard code representing the graphical element that has been recognized in association with the image, as discussed above.

Figure 9:
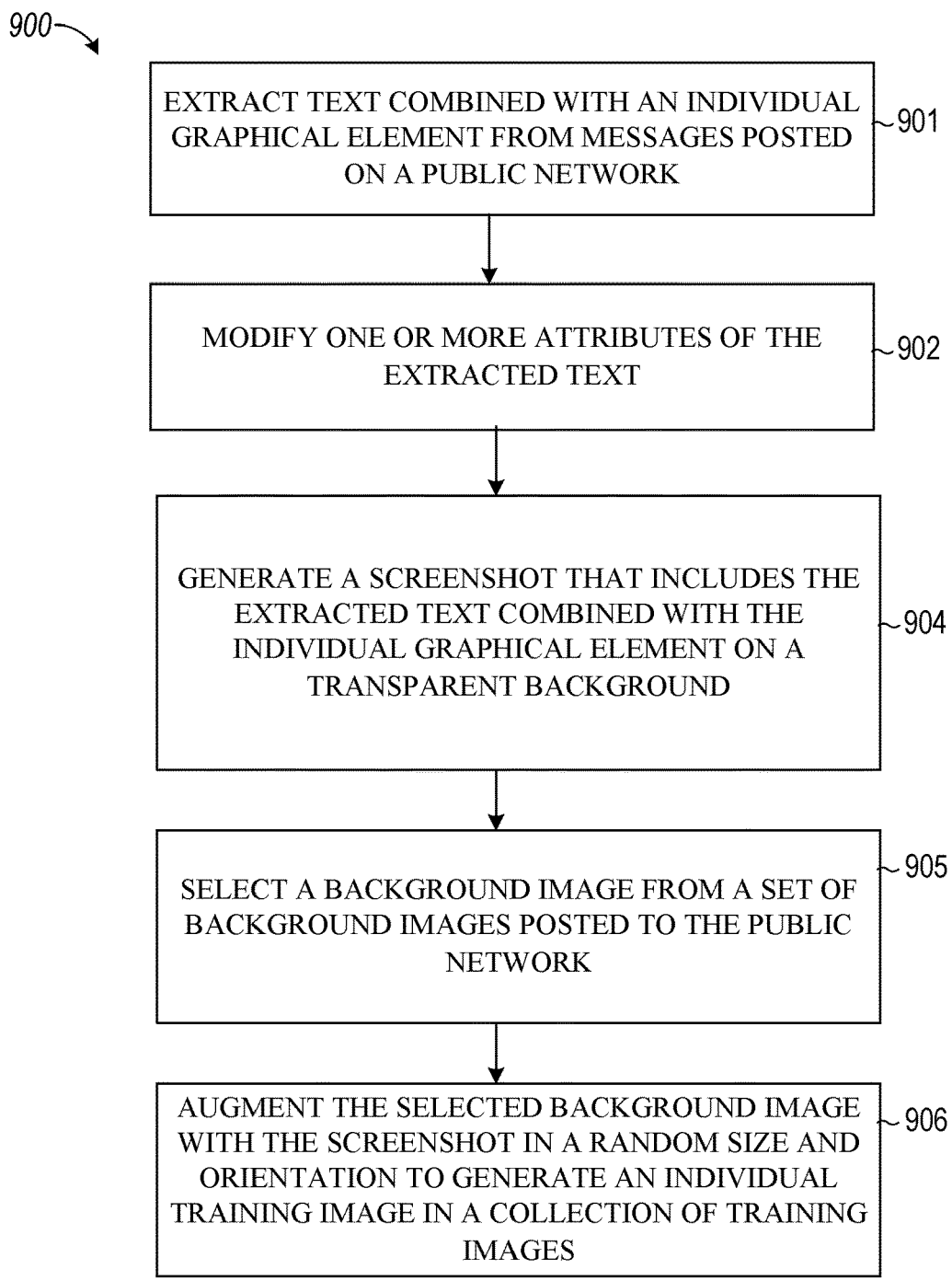

FIG. 9 is a flowchart of a process 900 performed by the optical character recognition system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the optical character recognition system 500 (e.g., a user system 102 or a server) extracts text combined with an individual graphical element from messages posted on a public network, as discussed above.

At operation 902, the optical character recognition system 500 modifies one or more attributes of the extracted text, as discussed above.

At operation 904, the optical character recognition system 500 generates a screenshot that includes the extracted text combined with the individual graphical element on a transparent background, as discussed above.

At operation 905, the optical character recognition system 500 selects a background image from a set of background images posted to the public network, as discussed above.

At operation 906, the optical character recognition system 500 augments the selected background image with the screenshot in a random size and orientation to generate an individual training image in a collection of training images, as discussed above.

EXAMPLES

Example 1

A method comprising: accessing an image depicting a real-world environment augmented with a graphical element; recognizing the graphical element in the image by applying a ML model to the image; and storing a standard code representing the graphical element that has been recognized in association with the image.

Example 2

The method of Example 1, wherein the graphical element comprises an emoji, wherein the standard code comprises Unicode of the graphical element.

Example 3

The method of any one of Examples 1-2, further comprising: generating a bounding box around a portion of the image that has been augmented with the graphical element by applying a text detection model to the image; cropping the portion of the image; and applying the ML model to the cropped portion of the image.

Example 4

The method of any one of Examples 1-3, wherein the image is further augmented with text, further comprising: recognizing the text in the image by applying the ML model to the image; and storing the recognized text and the standard code representing the graphical element in association with the image.

Example 5

The method of Example 4, further comprising: determining an orientation and position of the text and the graphical element by applying a text detection model to the image; in response to determining the orientation and position of the text and the graphical element, determining that the text and the graphical element are on a same line and along a same direction; and in response to determining that the text and the graphical element are on the same line and along the same direction, generating a first sentence that includes the text and the standard code.

Example 6

The method of Example 5, further comprising: detecting additional text in the image by applying the ML model to the image; determining that the additional text is on a different line than the text and the graphical element that are on the same line; and in response to determining that the additional text is on the different line than the text and the graphical element that are on the same line, generating a second sentence that includes the additional text.

Example 7

The method of any one of Examples 1-6, further comprising: generating training data for training the ML model, the training data comprising a collection of training images that depict real-world environments augmented with text and graphical elements, each of the training images in the collection of training images being associated with respective ground truth text and standard code representations of the graphical elements and respective ground truth location information of the text and graphical elements.

Example 8

The method of Example 7, wherein the text and graphical elements in the training images have different font styles, font sizes, font orientation, and font colors.

Example 9

The method of any one of Examples 7-8, further comprising: accessing messages posted on a public network by a first set of users; extracting text combined with an individual graphical element from the messages; modifying one or more attributes of the extracted text; generating a screenshot that includes the combined extracted text with the individual graphical element on a transparent background; selecting a background image from a set of background images posted to the public network by a second set of users; selecting a random size and orientation as a bounding box for the screenshot that includes the combined extracted text with the individual graphical element; and augmenting the selected background image with the screenshot in the random size and orientation to generate an individual training image in the collection of training images.

Example 10

The method of Example 9, further comprising trimming redundant margins around the combined extracted text with the individual graphical element in the screenshot.

Example 11

The method of any one of Examples 9-10, wherein the one or more attributes comprise at least one of a font style, a font size, a font orientation, and a font color.

Example 12

The method of any one of Examples 9-11, further comprising: associating the individual training image with ground truth information comprising the extracted text, the individual graphical element, and the selected random size and orientation.

Example 13

The method of any one of Examples 9-12, further comprising: preventing the bounding box for the screenshot from overlapping a different bounding box for another augmented element in the individual training image.

Example 14

The method of any one of Examples 9-13, further comprising: processing the set of background images to remove any background image from the set of background images that includes real-world or overlaid text using a text detection model.

Example 15

The method of any one of Examples 7-14, further comprising training the ML model by performing training operations comprising: selecting a first training image from the collection of training images depicting a first real-world environment augmented with a combination of text and one or more graphical elements; predicting a bounding box representing location information for the combination of text and the one or more graphical elements by applying a text detection model to the first training image; obtaining the ground truth location information for the combination of text and one or more graphical elements associated with the first training image; computing a deviation between the ground truth location information and the predicted bounding box; and updating one or more parameters of the text detection model based on the computed deviation between the ground truth location information and the predicted bounding box.

Example 16

The method of Example 15, further comprising: cropping a portion of the first training image using the predicted bounding box; recognizing the text and the one or more graphical elements in the first training image by applying the ML model to the first training image; obtaining the ground truth text and one or more standard code representations of the one or more graphical elements; computing an additional deviation between the ground truth text and the one or more standard code representations and the recognized text and the one or more graphical elements; and updating one or more parameters of the ML model based on the additional computed deviation.

Example 17

The method of any one of Examples 1-16, further comprising: categorizing or ranking the image based on the standard code representing the graphical element that has been recognized in association with the image.

Example 18

The method of any one of Examples 1-17, further comprising: searching a database of images to find one or more images that are related to the accessed image using the standard code representing the graphical element that has been recognized in association with the image.

Example 19

A system comprising: at least one processor; and at least one memory component having instructions stored thereon that, when executed by the at least one processor, cause the at least one processor to perform operations comprising: accessing an image depicting a real-world environment augmented with a graphical element; recognizing the graphical element in the image by applying a ML model to the image; and storing a standard code representing the graphical element that has been recognized in association with the image.

Example 20

A non-transitory computer-readable storage medium having stored thereon instructions that, when executed by at least one processor, cause the at least one processor to perform operations comprising: accessing an image depicting a real-world environment augmented with a graphical element; recognizing the graphical element in the image by applying a ML model to the image; and storing a standard code representing the graphical element that has been recognized in association with the image.

Machine Architecture

Figure 10:
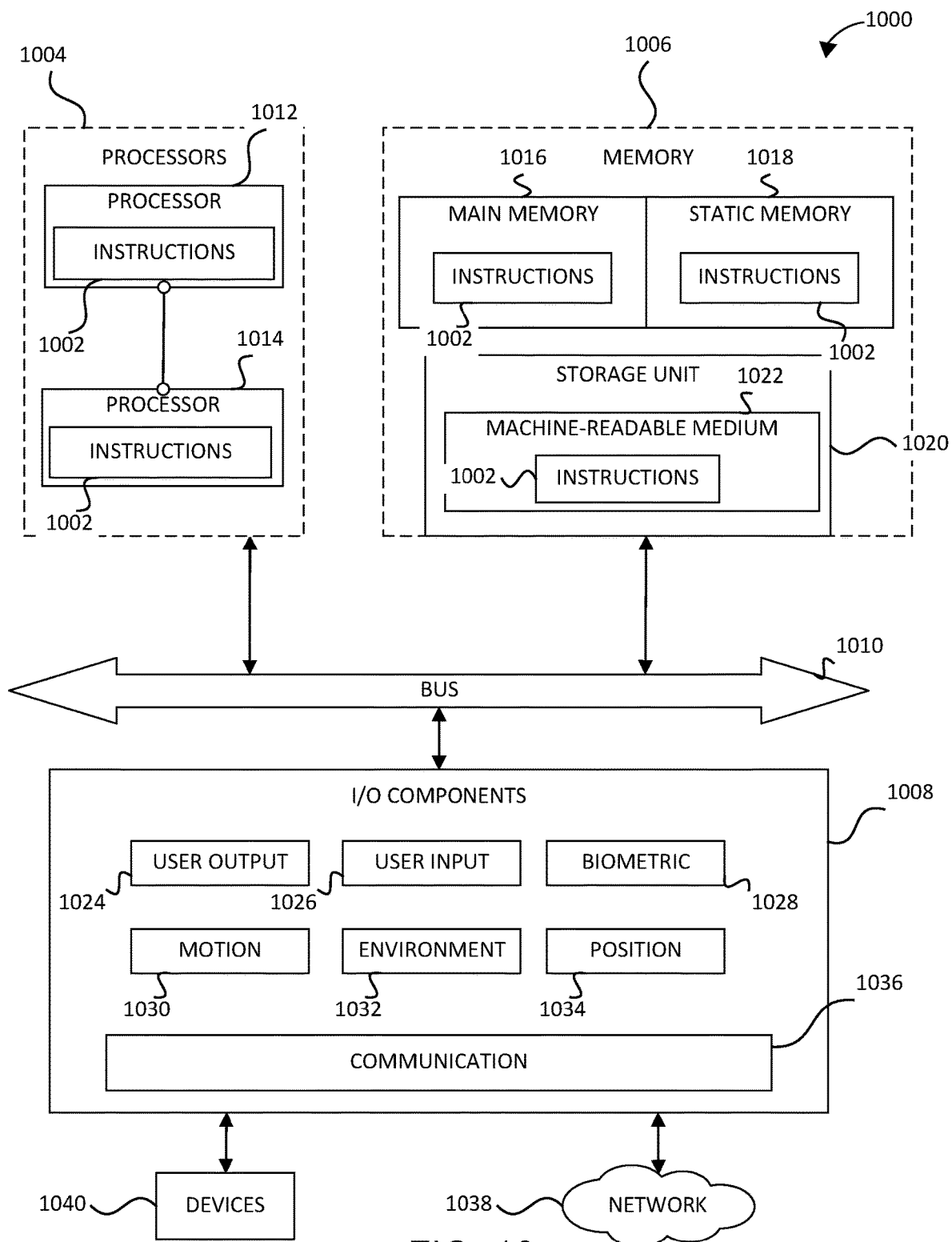
FIG. 10 is a diagrammatic representation of a machine in the form of a computer system within which a set of instructions may be executed to cause the machine to perform any one or more of the methodologies discussed herein, in accordance with some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output (I/O) components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad, or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a universal service bus (USB)).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., HTTP). Similarly, the instructions 1002 may be transmitted or received using a transmission medium via a coupling (e.g., a peer-to-peer coupling) to the devices 1040.

Software Architecture

Figure 11:
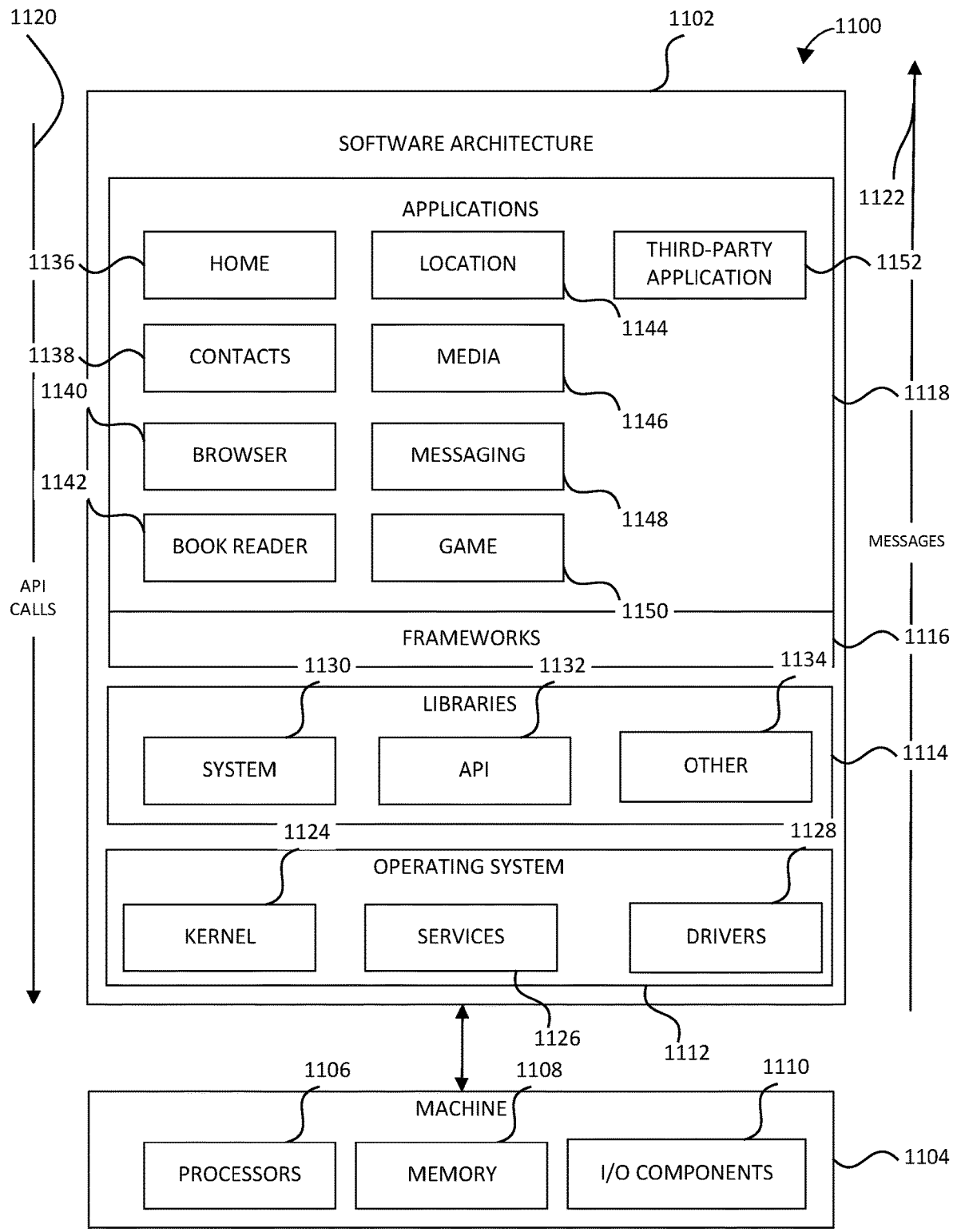
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various GUI functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

System with Head-Wearable Apparatus

Figure 12:
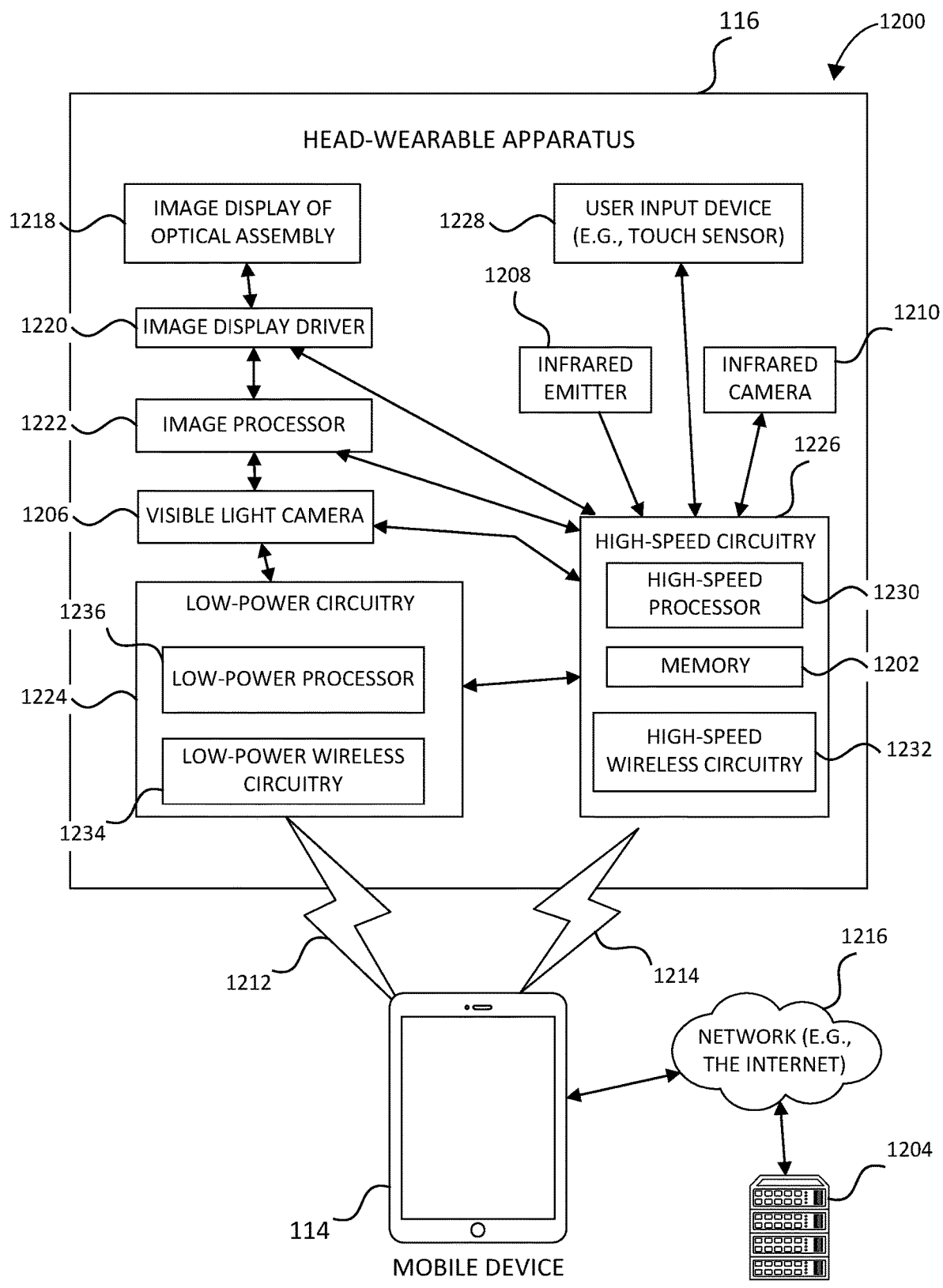
FIG. 12 illustrates a system in which a head-wearable apparatus may be implemented, in accordance with some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 1216.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of an image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a GUI, to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF), exchangeable image file format (EXIF), or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the GUI of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

Low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and a network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the memory of mobile device 114 to implement the functionality described herein.

Output components of the head-wearable apparatus 116 include visual components, such as a display such as a LCD, a PDP, a LED display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, (PDA, smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or interaction on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   accessing, by an image access component of an optical character recognition system that implements multiple machine learning models, an image depicting a real-world environment augmented with a graphical element, the image being augmented with text;
   recognizing, by a character recognition network of the optical character recognition system, the graphical element in the image by applying a machine learning (ML) model of the multiple machine learning models, to the image;
   storing, by an image categorization component of the optical character recognition system, a standard code representing the graphical element that has been recognized in association with the image;
   in response to determining an orientation and position of the text and the graphical element, determining that the text and the graphical element are on a same line; and
   in response to determining that the text and the graphical element are on the same line, generating a first sentence that includes the text and the standard code.

2. The method of claim 1, wherein the graphical element comprises an emoji, wherein the standard code comprises Unicode of the graphical element.

3. The method of claim 1, further comprising:
   generating a bounding box around a portion of the image that has been augmented with the graphical element by applying a text detection model to the image;
   cropping the portion of the image; and
   applying the ML model to the cropped portion of the image.

4. The method of claim 1, wherein the image is further augmented with text, further comprising:
   recognizing the text in the image by applying the ML model to the image; and
   storing the recognized text and the standard code representing the graphical element in association with the image.

5. The method of claim 4, further comprising:
   determining the orientation and position of the text and the graphical element by applying a text detection model of the multiple machine learning models to the image.

6. The method of claim 5, further comprising:
   detecting additional text in the image by applying the ML model to the image;
   determining that the additional text is on a different line than the text and the graphical element that are on the same line; and
   in response to determining that the additional text is on the different line than the text and the graphical element that are on the same line, generating a second sentence that includes the additional text.

7. The method of claim 1, further comprising:
   generating training data for training the ML model, the training data comprising a collection of training images that depict real-world environments augmented with text and graphical elements, each of the training images in the collection of training images being associated with respective ground truth text and standard code representations of the graphical elements and respective ground truth location information of the text and graphical elements.

8. The method of claim 7, wherein the text and graphical elements in the training images have different font styles, font sizes, font orientation, and font colors.

9. The method of claim 7, further comprising:
   accessing messages posted on a public network by a first set of users;
   extracting text combined with an individual graphical element from the messages;
   modifying one or more attributes of the extracted text;
   generating a screenshot that includes the combined extracted text with the individual graphical element on a transparent background;
   selecting a background image from a set of background images posted to the public network by a second set of users;
   selecting a random size and orientation as a bounding box for the screenshot that includes the combined extracted text with the individual graphical element; and
   augmenting the selected background image with the screenshot in the random size and orientation to generate an individual training image in the collection of training images.

10. The method of claim 9, further comprising trimming redundant margins around the combined extracted text with the individual graphical element in the screenshot.

11. The method of claim 9, wherein the one or more attributes comprise at least one of a font style, a font size, a font orientation, and a font color.

12. The method of claim 9, further comprising:
    associating the individual training image with ground truth information comprising the extracted text, the individual graphical element, and the selected random size and orientation.

13. The method of claim 9, further comprising:
preventing the bounding box for the screenshot from overlapping a different bounding box for another augmented element in the individual training image.

14. The method of claim 9, further comprising:
processing the set of background images to remove any background image from the set of background images that includes real-world or overlaid text using a text detection model.

15. The method of claim 7, further comprising training the ML model by performing training operations comprising:
selecting a first training image from the collection of training images depicting a first real-world environment augmented with a combination of text and one or more graphical elements;
predicting a bounding box representing location information for the combination of text and the one or more graphical elements by applying a text detection model to the first training image;
obtaining the ground truth location information for the combination of text and one or more graphical elements associated with the first training image;
computing a deviation between the ground truth location information and the predicted bounding box; and
updating one or more parameters of the text detection model based on the computed deviation between the ground truth location information and the predicted bounding box.

16. The method of claim 15, further comprising:
cropping a portion of the first training image using the predicted bounding box;
recognizing the text and the one or more graphical elements in the first training image by applying the ML model to the cropped portion of the first training image;
obtaining the ground truth text and one or more standard code representations of the one or more graphical elements;
computing an additional deviation between the ground truth text and the one or more standard code representations and the recognized the text and the one or more graphical elements; and
updating one or more parameters of the ML model based on the additional computed deviation.

17. The method of claim 1, further comprising:
categorizing or ranking the image based on the standard code representing the graphical element that has been recognized in association with the image.

18. The method of claim 1, further comprising:
searching a database of images to find one or more images that are related to the accessed image using the standard code representing the graphical element that has been recognized in association with the image.

19. A system comprising:
at least one processor; and
at least one memory component having instructions stored thereon that, when executed by the at least one processor, cause the at least one processor to perform operations comprising:
accessing, by an image access component of an optical character recognition system that implements multiple machine learning models, an image depicting a real-world environment augmented with a graphical element, the image being augmented with text;
recognizing, by a character recognition network of the optical character recognition system, the graphical element in the image by applying a machine learning (ML) model of the multiple machine learning models, to the image;
storing, by an image categorization component of the optical character recognition system, a standard code representing the graphical element that has been recognized in association with the image;
in response to determining an orientation and position of the text and the graphical element, determining that the text and the graphical element are on a same line; and
in response to determining that the text and the graphical element are on the same line, generating a first sentence that includes the text and the standard code.

20. A non-transitory computer-readable storage medium having stored thereon instructions that, when executed by at least one processor, cause the at least one processor to perform operations comprising:
accessing, by an image access component of an optical character recognition system that implements multiple machine learning models, an image depicting a real-world environment augmented with a graphical element, the image being augmented with text;
recognizing, by a character recognition network of the optical character recognition system, the graphical element in the image by applying a machine learning (ML) model of the multiple machine learning models, to the image;
storing, by an image categorization component of the optical character recognition system, a standard code representing the graphical element that has been recognized in association with the image;
in response to determining an orientation and position of the text and the graphical element, determining that the text and the graphical element are on a same line; and
in response to determining that the text and the graphical element are on the same line, generating a first sentence that includes the text and the standard code.

* * * * *